Patented Feb. 28, 1933

1,899,584

UNITED STATES PATENT OFFICE

LOUIS NAVIAS, OF SCHENECTADY, NEW YORK, ASSIGNOR TO GENERAL ELECTRIC COMPANY, A CORPORATION OF NEW YORK

METHOD OF FORMING SHAPED ARTICLES

No Drawing.   Application filed November 13, 1928.  Serial No. 319,184.

The present invention relates to the fabrication of materials having little or no inherent plasticity, and comprises an improved plasticising agent or binder for such materials. As an example of one of the more important applications of my invention I may mention the manufacture by extrusion of slender rods or fine bore tubing from non-plastic materials not readily susceptible to shaping by ordinary methods.

In accordance with my invention there is added to the materials to be formed while in a finely divided condition a binder material containing water together with a stabilizing agent which prevents the separation of the water when pressure is exerted upon the molding composition. I have found that electrolytes in general constitute efficient stabilizing agents, the basic electrolytes and in particular ammonia being preferred.

For the agglutinant or adhesive binder a starchy material is preferred. The best results have been obtained by using as an agglutinant a paste made from wheat flour.

My invention is applicable to the fabrication of shaped articles from metals, such as tungsten, iron, copper, nickel, from non-metals, such as carbon or silicon, from oxides, such as zirconia, alumina, magnesia, thoria, from compounds, such as aluminates or silicates, or from minerals such as clay or feldspar.

The following specific examples will furnish a basis for a complete understanding of my invention.

A binder is prepared by mixing at room temperature by weight about 50 grams of wheat flour and 300 grams of water and heating until a pasty mass or gel is formed. To this mass an electrolyte, such as ammonia, sodium or potassium hydroxide, or acetic acid is added, in the case of ammonia 25 c. c. of a concentrated solution is added. Although the ammonia is preferred as a stabilizing agent for some purposes, as it is volatilizable, and hence leaves no residue which may combine chemically with the main ingredients, a suitable amount of a 20% sodium hydroxide solution may be used with good results when such combination is not objectionable.

About 100 parts by weight of a refractory oxide, as for example, magnesia, or a mixture of refractory materials such as magnesia and talc, are mixed with about 30 to 40 parts by weight of a paste prepared as above directed. The mixture may be shaped by extrusion or by molding. When the article to be manufactured is molded a lesser amount of binder is required. The product is baked at a temperature of about 100° C. thereby producing sufficient strength in the product to permit machining. In some instances the baking step may be omitted. In either case the product is finally fired at a temperature sufficiently high to sinter it to remove carbonaceous residue and to produce the required mechanical strength. In some instances it is preferable to carry out the firing in hydrogen, or other reducing gas. In other instances the firing may be carried out in an oxidizing atmosphere. In the case of either kinds of firing the final product is free of carbon and carbonaceous matter. Articles consisting of magnesia or alumina may receive a final sintering temperature of about 1600 to 1700° C. or even higher.

The basic flour paste may be used in accordance with my invention to produce porcelain articles without the use of ball clay. In the usual methods of making porcelain or similar ceramic articles ball clay is added to supply the plastic properties required for shaping the green porcelain mixture. The ball clay also helps to vitrify the ceramic body. There are certain disadvantages however attendant upon the addition of ball clay. Its high shrinkage during firing sometimes produces warping and its impurities tend to color the porcelain. In accordance with my invention I have produced ceramic mixtures plasticized with an agglutinant containing a stabilizing agent. For example, about 37 to 50 parts feldspar, about 16 parts of flint, about 11 to 17 parts of Florida kaolin and about 23 to 27 parts of china clay are mixed with sufficient basic flour paste to render the mass plastic. When the plastic mass is to be extruded about 6 to 2 per cent of binder should be used. Pressing requires less binder. The porcelain ingredients may be milled together dry in a ball mill and then mixed with the flour paste until a plastic mass is obtained. If machining is required the shaped articles after air drying may be baked at about 100° C.

The baked articles are fired in a porcelain kiln at a temperature of about 1300° C. or higher depending upon the maturing temperature of the mixture. During the baking and firing all trace of the flour paste binder disappears. The final product is whiter in color than ordinary porcelain containing ball clay. Such porcelain may be glazed in the usual manner if so desired.

Talc, pyrophyllite and other minerals may be similarly fabricated.

In a similar manner powdered metals and other refractory materials may be bonded with a basic flour paste binder in accordance with my invention. For example, finely divided metallic tungsten powder may be pressed into desired form with about 3 to 5 per cent by weight of alkaline flour paste. Upon drying in the air or preferably upon baking to 100° C. the resulting tungsten articles become quite hard and strong and in this condition may be machined if desired. Finely divided metallic tungsten powder may be extruded into lengths of rods and tubes, the amount of binder then preferably being as high as 14 to 20% by weight.

Cutting tools may be made from carbide of tungsten and cobalt, or from tungsten, carbon and cobalt using a basic flour paste binder. For example, 50 parts by weight of a mixture containing 87 per cent of the carbide and 13 per cent cobalt may be mixed with 8 parts of flour paste, and extruded. The shaped mass is fired at 1410° C. for about 1½ hours thereby producing a very hard, solid product, which is capable of taking a high polish.

In accordance with my invention articles may be fabricated from oxides of metals which cannot be readily fabricated by other known methods. For example, crucibles, tubes, rods and similar articles may be made from zinc oxide using an alkaline flour paste binder.

What I claim as new and desire to secure by Letters Patent of the United States, is:

1. The method of forming shaped articles from non-plastic materials which comprises mixing with said materials in finely divided state a stable gel comprising starchy material, an electrolyte and water, said gel being composed largely of water, and extruding said mixture.

2. The method of forming a shaped, machinable article from a normally non-plastic, refractory oxide, which comprises mixing with said oxide a basic gel composed of flour, ammonia and water, the latter being approximately 80% by weight of the gel, extruding the mixture to shape it into the desired form and firing the product at a temperature sufficiently high to sinter it and remove carbonaceous material and to impart the required mechanical strength thereto.

In witness whereof, I have hereunto set my hand this 12th day of November, 1928.

LOUIS NAVIAS.